United States Patent [19]

Strachan

[11] Patent Number: 5,264,170
[45] Date of Patent: Nov. 23, 1993

[54] METHOD OF MANUFACTURING PULTRUDED PROFILES

[75] Inventor: Robert Strachan, Peterhead, Scotland

[73] Assignee: Caledonia Composites Limited, Aberdeen, Scotland

[21] Appl. No.: 776,252

[22] PCT Filed: Mar. 27, 1991

[86] PCT No.: PCT/GB91/00462
§ 371 Date: Nov. 14, 1991
§ 102(e) Date: Nov. 14, 1991

[87] PCT Pub. No.: WO91/16192
PCT Pub. Date: Oct. 31, 1991

[30] Foreign Application Priority Data

Apr. 8, 1990 [GB] United Kingdom ............ 9008655

[51] Int. Cl.$^5$ ............... B28B 1/08; B29C 47/06; B32B 31/04
[52] U.S. Cl. ..................... 264/70; 156/166; 156/180; 156/441; 264/172; 264/173; 264/174; 264/257; 264/258; 425/197
[58] Field of Search ............... 264/69–72, 264/174, 165, 257, 258, 172, 173; 156/166, 180, 441; 425/197

[56] References Cited

U.S. PATENT DOCUMENTS

| 2,751,320 | 6/1956 | Jacobs et al. | 156/441 X |
|---|---|---|---|
| 2,887,721 | 5/1959 | Blanchi et al. | 264/70 X |
| 3,185,747 | 5/1965 | Boggs | 156/166 X |
| 3,235,429 | 2/1966 | Boggs | 156/166 |
| 3,249,481 | 5/1966 | Boggs | 156/441 X |
| 3,256,559 | 6/1966 | Boggs | 156/441 X |
| 3,374,132 | 3/1968 | Boggs | 156/441 X |
| 3,769,127 | 10/1973 | Goldsworthy et al. | 156/180 X |
| 4,436,682 | 3/1984 | Knopp | 264/70 |
| 4,685,873 | 8/1987 | Willard et al. | |
| 4,790,257 | 12/1988 | Schermutzki | 264/70 X |
| 5,120,380 | 6/1992 | Strachan | 156/180 X |

FOREIGN PATENT DOCUMENTS

| 84074 | 7/1983 | European Pat. Off. | 264/71 |
|---|---|---|---|
| 1604438 | 2/1972 | Fed. Rep. of Germany . | |
| 2319254 | 10/1974 | Fed. Rep. of Germany | 264/70 |
| 41504 | 2/1986 | Japan | 264/70 |
| 749779 | 5/1956 | United Kingdom | 264/23 |
| 933993 | 8/1963 | United Kingdom | 156/180 |
| 2138731 | 10/1984 | United Kingdom | 264/70 |
| 2143768 | 2/1985 | United Kingdom . | |
| 8505071 | 11/1985 | United Kingdom . | |
| 8808367 | 11/1988 | United Kingdom . | |

Primary Examiner—Karen Aftergut
Attorney, Agent, or Firm—Bell, Seltzer, Park & Gibson

[57] ABSTRACT

Pultruded profiles are manufactured as a die station which is fed with resin via a pump. The core of the profile is formed by granular material fed to station from a hopper through the interior of a hollow duct which is essentially vertically disposed, above the station, so that the granular material is moved under the influence of gravity. The exterior surface of duct is profiled and the skin-forming materials for the profile are guided by the profiled surface to the die station. The skin forming materials are runs of cloth. The pultruded profile may be tubular or hollow so that it has both an external surface and an internal surface in which case the internal surface incorporates a further resin bonded cloth fed to the interior of the die station over the external surface of a mandrel.

2 Claims, 1 Drawing Sheet

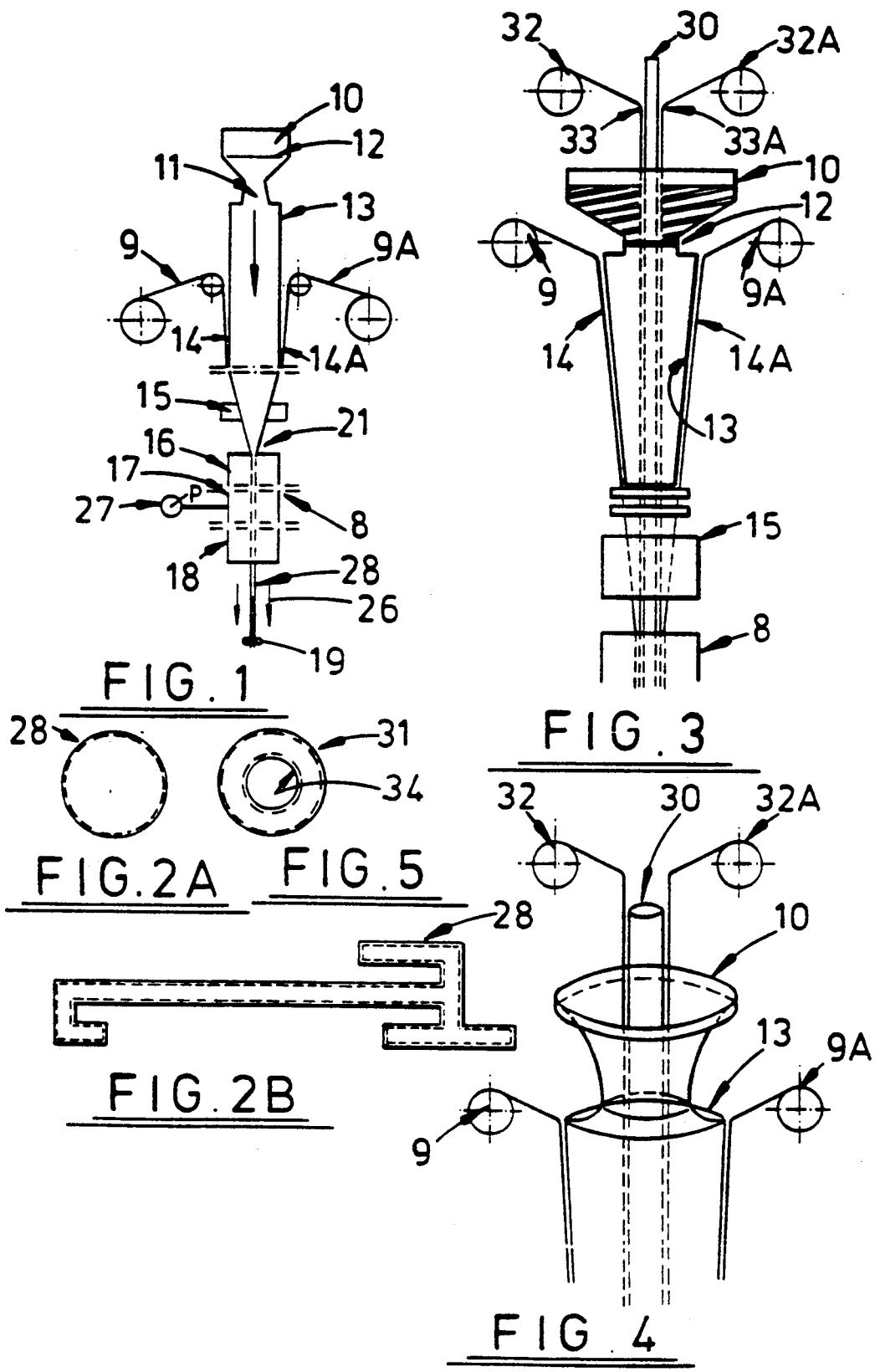

METHOD OF MANUFACTURING PULTRUDED PROFILES

This invention relates to in-line core-filled pultruded profiles.

One form of pultruder for the manufacture of in-line core-filled pultruded profiles is known from International Patent Specification No W088/08367 which discloses an arrangement in which the dry materials are fed along a generally horizontal path to a pultrusion die where a bonding resin is injected in a manner which effects complete resin wet through so that the resultant product which emerges from the die has excellent filler bonding and surface finish. The dry materials comprise particulate core filling materials (such as silicate hollow spheres, vermiculite and many more and of varying relatively light weights) which are borne along the horizontal path by an air stream generated by a variable output Venturi blower. The path extends through the interior of a duct which tapers along its length and externally is shaped progressively to conform to the cross-sectional shape of the die. The exterior surface of the duct acts as a guide for runs of dry cloth which are fed to the die to provide a cloth skin as an integral part of the resultant pultrusion.

It is an object of the present invention to provide a new and improved system of manufacturing pultruded profiles having a skin resin-bonded to a core.

According to the present invention there is provided a system of manufacturing pultruded profiles having a skin resin-bonded to a core, comprising separately feeding core-forming materials and a skin-forming cloth to the inlet of a pultrusion die station which includes a resin-curing die having a cross-sectional shape for determining the cross-sectional shape of the profile, the core-forming materials being delivered to the die station inlet through the interior of a hollow duct and the skin-forming cloth being delivered over the external surface of the duct to the die station inlet, introducing bonding resin to said station, and pulling from the outlet of said station an in-line cored resin-bonded profile, characterised in that the hollow duct is essentially vertically disposed and the core-filling materials are moved through the duct under the influence of gravity to the die station.

By virtue of the present invention the core-filling materials are not propelled by an air stream so that the apparatus is simpler than hitherto by the absence of a variable output Venturi blower and the vertical disposition of the duct with gravity feed of the core filling materials renders the system insensitive to the specific weight of these materials. Accordingly a much wider weight range of such materials can now be used. Furthermore it is comparatively easy to achieve an even distribution of these materials across the cross-sectional area of the profile. This may be achieved, for example, by means of a vibratory screen at the top of the duct.

The present invention also provides a system of manufacturing tubular pultruded profiles having internal and external skins resin-bonded to a core, comprising separately feeding core-forming materials and skin-forming cloths along substantially vertical pathways to the inlet of a pultrusion die station which includes a resin-curing die having a cross-sectional shape for determining the external cross-sectional shape of the profile and a vertically-disposed mandrel having a cross-sectional shape for determining the internal cross-sectional shape of the profile, the external skin-forming cloth being delivered to the die station inlet over the external surface of a vertically-disposed hollow duct which surrounds the mandrel, the internal skin-forming cloth being delivered to the die station inlet over the external surface of the mandrel, and the core-forming materials being delivered under the influence of gravity to the die station inlet through the annular space between the duct and the internal skin-forming cloth.

It will be appreciated that the manufacture of tubular pultruded profiles is rendered practical by the absence of an air stream to carry the core-forming materials and this in turn is rendered practical by gravity feed of the core-filling materials through a vertically disposed duct.

The skin-forming cloth material is generally as described in W088/08367 and the core-forming materials may also be as therein described but additionally may be of substantially heavier weights. Likewise, the duct and pultrusion die is substantially as previously described in W088/08367.

Embodiments of the present invention will now be described by way of example with reference to the accompanying drawings, in which FIG. 1 is a schematic illustration of a system of manufacturing pultruded profiles in accordance with the present invention;

FIGS. 2A and 2B illustrate alternative profiles which can be produced by the system of FIG. 1;

FIG. 3 illustrates a modification of the FIG. 1 system that is adapted to produce tubular profiles;

FIG. 4 schematically illustrates a detail of the FIG. 3 system, and

FIG. 5 illustrates a profile which can be produced by the system of FIG. 3.

In the system of manufacturing pultruded profiles which is shown in FIG. 1 cloth, preferably woven fibre-glass 14, 14A, is delivered by supply rolls 9, 9A and guided over the external profiled surface of a former duct 13 to a pre-die former 15, through the dies 16, 17, 18, of a die station 8 to cloth pulling rolls 19. The duct 13 is hollow, is vertically orientated, and at its end 11 remote from the former 15 there is delivered particulate core filling material, from a hopper 10 incorporating a vibratory screen 12. The particulate core filling material is fed under the influence of gravity towards the die station 8 and forms a body of core filling material filling the space between the runs of cloth 14, 14A, in the gap 21 between the pre-die former 15 and the leading die section 16 of station 8. The cloth runs 14, 14A, when secured to the start rolls 19 are fashioned to occupy the contours of the dies in station 8 and are held in this configuration through the pre-die former 15 and over part of the exterior surface of the duct 13 which is elongate and is provided with an external shape which progressively along its length conforms to the cross sectional shape of the resin curing die 18 and at the die station end of the duct 13 is similar in cross section but oversize in relation to that of the resin curing die 18. The cloth 14, 14A, is held under slight longitudinal tension by a combination of the effect of supply rolls 9, 9A, and rolls 19. When the start or take up rolls 19 are set in motion and cloth 14, 14A, is pulled, the cloth with its core forming materials (initially held in place by a shaped plug (not shown) fitted into the space between the cloth runs 14, 14A in gap 21) progresses through the die station 8 which is supplied with resin fed to injection die 17 via a pump 27. The emergent profile 28 which is resin cured is collected by retractable pullers 26 which progress the profile and permit the cloth rolls 19 to be separated since they no longer function when the cloth 14, 14A, has been resin bonded. Curing die 18 is programmed to function at the appropriate temperature for curing the resin.

The pre-die former 15 which at its outlet end is of dimension slightly in excess of the curing die 18 is located in proximity to but spaced from the bell mouth entry of the leading or forming die section 16, the precise spacing 21 being determined to permit the cloth 14, 14A, to form completely and move without distorting with core material in the gap or space 21 in the form of a slightly raised moving wall which completely occupies the hollow profile shape and is encased between the two runs of cloth 14, 14A which overlap along their longitudinal edges thus preventing discharge of filler material.

The interior surface of the duct 13 may also conform progressively along its length to the cross-sectional shape of the die 18 and at the die station end is similar in cross-section to that of the die 18 so that the core-forming materials progressively conform to the cross-sectional shape of the die 18 as they approach the die station.

FIGS. 2A and 2B illustrate alternative profiles 28 which can be produced by the FIG. 1 system from which it will be appreciated that simple or complex cross-sectional shapes are possible and in each instance the core is solid. However because duct 13 is vertically oriented the specific weight of the core is not limited and virtually any weight of particulate core filling materials may be used and which are capable of being evenly distributed across the core cross section by the vibratory screen 12.

FIGS. 3 and 4 illustrate a modified version of the FIG. 1 system in which a mandrel 30 traverses the length of the hopper 10, the duct 13 and the die station 8 in order to enable tubular profiles such as profile 31 of FIG. 5 to be manufactured. For this purpose in addition to cloth supply rolls 9, 9A there are provided cloth supply rolls 32, 32A which provide cloth runs 33, 33A guided into die station 8 over the external surface of the mandrel 30 so that these runs 33, 33A form the internal skin 34 of the profile 31. The mandrel 30 is secured at its upper end to a support structure (not shown) and initially is centred at its lower end in the die 8 by the starting plug (not shown). However when the system is in normal operation, having progressed beyond its start-up phase, the lower end of the mandrel is essentially self centred by the annular body of core filling materials provided from the hopper 10 between the interior surface of the duct 13 and the exterior surface of the cloth-covered mandrel 30 which a and beyond the die station are substantially solid.

Vibratory screen 12 in the FIG. 3 system is annular and in both systems contributes to exact placement and good packing of the particulate matter in the profile 28, 31 without significant restriction on granular size or weight.

I claim:

1. A method of manufacturing pultruded profiles having a skin resin-bonded to a core, the method comprising the steps of:
    (a) providing a vertically disposed pultrusion die station defining an inlet and an outlet and which includes a resin-curing die having a cross-sectional shape for determining a cross-sectional shape of a profile;
    (b) providing a hollow duct vertically disposed above the die station and defining an interior and having an external surface;
    (c) feeding granular core-forming material to the inlet of the die station through the interior of the hollow duct and utilizing gravitational forces to move the material vertically downwards through the duct;
    (d) vibrating a vibratory screen in an upper portion of the interior of the hollow duct so as to achieve a substantially uniform distribution of the core-forming material in the interior of the hollow duct;
    (e) introducing bonding resin to the die station; and
    (g) pulling an in-line core with resin-bonded skin, as the pultruded profile, from the outlet of the die station.

2. A method of manufacturing tubular pultruded profiles having internal and external skins resin-bonded to a core, the method comprising the steps of:
    (a) providing a vertically disposed pultrusion die station defining an inlet and an outlet and which includes a resin-curing die having a cross-sectional shape for determining an external cross-sectional shape of a profile;
    (b) providing a vertically disposed mandrel having an external surface and having a cross-sectional shape for determining an internal cross-sectional shape of the profile;
    (c) providing a hollow duct vertically disposed above the die station and surrounding the mandrel and having internal and external surfaces;
    (d) feeding external skin-forming cloth to the inlet of the die station over the external surface of the hollow duct;
    (e) feeding internal skin-forming cloth to the inlet of the die station over the external surface of the mandrel and spaced from the internal surface of the hollow duct, to form an annular space between the internal surface of the hollow duct and the internal skin-forming cloth;
    (f) separately feeding granular core-forming material to the inlet of the die station and utilizing gravitational forces to move the material vertically downwards through the annular space between the internal surface of the hollow duct and the internal skin-forming cloth;
    (g) introducing bonding resin to the die station; and
    (h) pulling an in-line core resin-bonded profile having internal and external skins resin-bonded to the core from the outlet of the die station.

* * * * *

UNITED STATES PATENT AND TRADEMARK OFFICE
CERTIFICATE OF CORRECTION

PATENT NO. : 5,264,170
DATED : November 23, 1993
INVENTOR(S) : Strachan

It is certified that error appears in the above-identified patent and that said Letters Patent is hereby corrected as shown below:

Item [30]:
On the cover page, "Apr. 8, 1990" should be -- Apr. 18, 1990 --.

In the Abstract, line 1, "as" should be -- at --.

Column 3, line 57, "a" should be -- at --.

Column 4, line 23, "(e)" should read -- separately feeding a skin-forming cloth to the inlet of the die station over the external suface of the duct; --.

Column 4, line 23, "(e)" should be -- (f) --.

Signed and Sealed this

Tenth Day of May, 1994

Attest:

BRUCE LEHMAN

Attesting Officer

Commissioner of Patents and Trademarks